(12) United States Patent
Taniguchi et al.

(10) Patent No.: US 11,642,846 B2
(45) Date of Patent: May 9, 2023

(54) PRINTHEAD DISPENSING DEPOSITION MATERIAL FOR 3D FABRICATION APPARATUS

(71) Applicant: Hideo Taniguchi, Kyoto (JP)

(72) Inventors: Hideo Taniguchi, Kyoto (JP); Nobuhisa Ishida, Kyoto (JP)

(73) Assignee: Hideo Taniguchi, Kyoto (JP)

( * ) Notice: Subject to any disclaimer, the term of this patent is extended or adjusted under 35 U.S.C. 154(b) by 161 days.

(21) Appl. No.: 16/968,356

(22) PCT Filed: Feb. 9, 2018

(86) PCT No.: PCT/JP2018/004633
§ 371 (c)(1),
(2) Date: Aug. 7, 2020

(87) PCT Pub. No.: WO2019/155611
PCT Pub. Date: Aug. 15, 2019

(65) Prior Publication Data
US 2021/0379825 A1 Dec. 9, 2021

(51) Int. Cl.
*B29C 64/209* (2017.01)
*B33Y 30/00* (2015.01)
(Continued)

(52) U.S. Cl.
CPC .......... *B29C 64/209* (2017.08); *B29C 64/118* (2017.08); *B33Y 30/00* (2014.12); *B29K 2071/00* (2013.01)

(58) Field of Classification Search
CPC ............................ B29C 64/118; B29C 64/209
See application file for complete search history.

(56) References Cited

U.S. PATENT DOCUMENTS

2016/0067920 A1* 3/2016 Fontaine ............... B29C 64/106
264/255
2016/0236409 A1* 8/2016 Armani ................. B29C 64/106
(Continued)

FOREIGN PATENT DOCUMENTS

CN 105235218 A 1/2016
CN 105499572 A 4/2016
(Continued)

OTHER PUBLICATIONS

Mattroberts, "Mattroberts' Hot End," Published May 6, 2011, retrieved online Mar. 11, 2022 https://reprap.org/wiki/Mattroberts%27_Hot_End (Year: 2011) (Year: 2011).*
(Continued)

*Primary Examiner* — Manley L Cummins, IV
(74) *Attorney, Agent, or Firm* — Dinsmore & Shohl LLP

(57) ABSTRACT

A printhead a supplying portion with a supplying opening of a filament; a melting portion to melt a filament supplied; a discharging portion having a discharging opening to discharge the melted filament. A heat insulating portion between the supplying portion and the melting portion are integrally formed to effectively suppress heat in the melting portion conducting to the supplying portion even when the melting portion is heated to high temperature, to maintain the temperature of the supplying portion to an appropriate temperature, and to efficiently utilize heat by the melting portion as a result of heating the melting portion.

10 Claims, 8 Drawing Sheets

(51) Int. Cl.
  *B29C 64/118* (2017.01)
  *B29K 71/00* (2006.01)

(56) References Cited

U.S. PATENT DOCUMENTS

2017/0057168 A1     3/2017  Miller et al.
2019/0099952 A1*    4/2019  MacNeish, III  ...... B29C 64/393

FOREIGN PATENT DOCUMENTS

| | | |
|---|---|---|
| CN | 206124226 U | 4/2017 |
| CN | 206317401 U | 7/2017 |
| JP | 3205019 U | 6/2016 |
| JP | 5982732 B1 | 8/2016 |
| JP | 5992732 B2 | 9/2016 |
| JP | 2017-035811 A | 2/2017 |
| JP | 6154055 B1 | 6/2017 |

OTHER PUBLICATIONS

International Search Report dated Apr. 10, 2018; International Applicaiton PCT/JP2018/004633.

Japan Patent Office, Notice of Reasons for Refusal issued in corresponding Japanese application No. 2018-192746, dated Dec. 21, 2021, 8 pp.

* cited by examiner

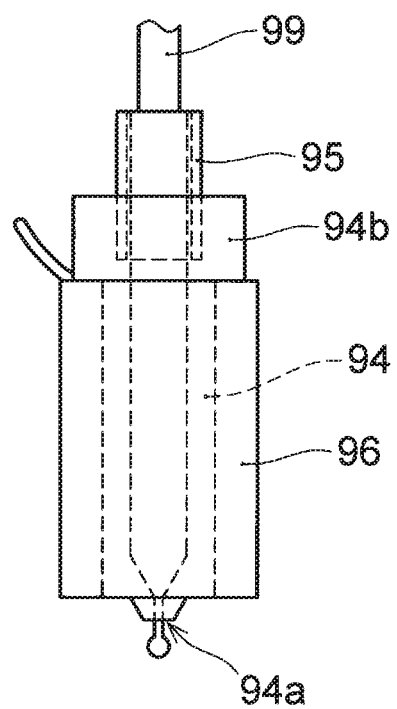

PRINTHEAD DISPENSING DEPOSITION MATERIAL FOR 3D FABRICATION APPARATUS

CROSS-REFERENCE TO RELATED APPLICATIONS

This application is the U.S. national stage of PCT/JP2018/004633 filed Feb. 9, 2018, the entire content is incorporated herein by reference in it's entirety.

FIELD OF THE INVENTION

The invention relates to a printhead dispensing deposition material (hot end) for a 3D fabrication apparatus (3D printer).

BACKGROUND OF THE INVENTION

In recent years, manufacturing a three-dimensional fabricated object with a 3D printer using a computer has become popular. As such a printhead dispensing deposition material, one having the structure as shown in FIG. 6 is known, for example. This printhead has the structure in which a nozzle 91 is screwed into one end side of a heater block 93 so as to cause a discharging portion 91a to protrude, and a barrel 92 is screwed into the other end side of the heater block 93 with a supplying portion of a deposition material being led out, wherein a wire-like deposition material (a filament 99) is inserted to the barrel 92 and the deposition material is heated and melted by the heater block 93 to cause the heated and melted deposition material to be discharged (dispensed) from the discharging portion 91a. Here, the filament 99 is fed into the barrel 92 in an amount as needed by a control signal to cause the filament 99 in an amount necessary to be discharged from the discharging portion 91a, and the position of this discharging portion 91a relatively moves in the xyz directions with a fabrication table (not shown), the fabrication table on which a fabricated object is formed, to keep depositing the deposition material being discharged, causing a desired three-dimensional fabricated object to be formed.

However, in such a printhead, when one attempts to heat the nozzle 91 by the heater block 93 to melt the filament 99 to keep the inside of the nozzle 91 and the barrel 92 at an appropriate melting temperature, the filament 99 melts also in the barrel 92 since the temperature of the barrel 92 is brought to be the same as that of the nozzle 91, so that it is necessary to provide a heat dissipating fin (not shown) in the barrel 92 and forcibly conduct cooling by a fan, preventing a size reduction of the printhead.

Thus, the Applicant has previously proposed a printhead in which a higher melting point deposition material can also be used by reducing the size and the weight thereof and facilitating a high-temperature operation (Patent document 1). As shown in FIG. 7, this printhead comprises a metal block 94, in which a discharging portion 94a is formed at one end side thereof, an attaching portion 94b is formed at the other end side thereof, and an intermediate portion is configured as a melting portion; a barrel 95 being attached to the attaching portion 94b of the metal block 94; and a heating plate 96 being attached to the melting portion of the metal block 94, wherein the printhead is configured such that the heating plate 96 is joined to the metal block 94 using an inorganic joining material capable of withstanding the temperature of greater than or equal to 500° C., and the barrel 95 is attached to the attaching portion 94b of the metal block 94 via a heat insulating spacer. Joining the heating plate 96 such that it can withstand high temperature and alleviating heat of the metal block 94 escaping to the barrel 95 by using a heat insulating spacer makes it possible to improve a size and weight reduction, and the degree of freedom in selecting usable deposition materials and also allows a quick start.

SUMMARY OF THE INVENTION

Problem to be Solved by the Invention

However, the previously-described printhead is configured to be assembled with a plurality of components such as a metal block 94, a heat insulating spacer, and a barrel 95 as a heat insulating spacer is used, and, moreover, the metal block 94, the heat insulating spacer, and the barrel 95 are formed of different materials, so that component management and assembly operations are cumbersome, preventing a further size and weight reduction and improvement in durability, being the cause of inducing a decrease in reliability as the printhead.

Even more, while the temperature of the barrel 95 is ideally brought to a temperature being close to the ordinary temperature, merely using a heat insulating spacer causes heat conduction from the metal block 94 to the barrel 95 to be not suppressed sufficiently, so that a further cooling can be needed.

In view of such circumstances as described in the above, an object of the invention is to provide a printhead dispensing deposition material for a 3D fabrication apparatus that makes it possible to reduce the number of components to alleviate assembly operations and makes it possible to facilitate a size reduction, a weight reduction, an energy reduction, and a service life extension.

Moreover, another object of the invention is to provide a printhead dispensing deposition material for a 3D fabrication apparatus that makes it possible to facilitate an improvement in the degree of freedom in selecting a deposition material by making a high-temperature operation possible.

Means to Solve the Problem

The invention features integrally forming (integrally molding), in a seamless manner, a printhead or a head body by providing a heat insulating portion between a supplying portion of a deposition material and a melting portion to suppress heat used in the melting portion conducting to the supplying portion.

In other words, a printhead dispensing deposition material for a 3D fabrication apparatus according to the invention comprises: a supplying portion comprising a supplying opening of a deposition material; a melting portion to melt the supplied deposition material, with a heating member being attached; a discharging portion comprising a discharging opening to discharge the melted deposition material; and a heat insulating portion between the supplying portion and the melting portion, the heat insulating portion to suppress heat in the melting portion conducting to the supplying portion, wherein the supplying portion, the melting portion, the discharging portion, and the heat insulating portion are integrally formed.

Moreover, a printhead dispensing deposition material for a 3D fabrication apparatus according to a different viewpoint of the invention comprises a head body comprising a supplying portion comprising a supplying opening of a deposition material; a melting portion to melt the supplied deposition material; a discharging portion comprising a discharging opening to discharge the melted deposition material; and a heat insulating portion between the supplying portion and the melting portion, the heat insulating portion to suppress heat in the melting portion conducting to the supplying portion; and a heating member to be attached to the melting portion, wherein the head body is integrally formed; and the heating member comprises a heating head, the heating head comprises a heating element being formed on an insulating substrate.

According to these printheads, a heat insulating portion is configured to be formed between a supplying portion and a melting portion, making it possible to carry out fabricating with the temperature of the supplying portion being at a suitable temperature even when integrally forming from the supplying portion to the discharging portion. Moreover, heat as a result of heating the melting portion by a heating member escaping to the supplying portion side can be suppressed, making it possible to effectively utilize the heat in melting a deposition material to contribute to an energy reduction. Moreover, the printhead or the head body can be integrally formed to facilitate a size reduction, a weight reduction, and a service life extension of the printhead and also facilitate improvement in reliability thanks to the number of components being small (one component with respect to the printhead), and, in addition, reduce component management cost, assembly cost, and material cost.

According to the invention, the heat resistance of the heat insulating portion is preferably increased by the heat insulating portion being subjected to a process in which the cross-sectional area of the heat insulating portion is brought to be less than that of the melting portion. In other words, the heat insulating portion is subjected to a process in which the cross-sectional area thereof is decreased such that the heat resistance (the length/the cross-sectional area) is increased. The length of the heat insulating portion can be appropriately determined in relation to the heat conductivity of the material of the printhead or the head body.

More specifically, the heat insulating portion preferably comprises a thin wall portion in which the thickness of an outer wall is brought to be less than that of the melting portion and/or an opening being formed in the outer wall.

A heat insulating portion can be formed in this way to increase the heat resistance of the heat insulating portion to effectively suppress heat in a melting portion conducting to a supplying portion and to increase the selection choices on usable materials in a case that a printhead or a head body is integrally formed.

As the material for the printhead or the head body according to the invention, a metal material such as iron alloy (stainless steel), nickel alloy, titanium, or titanium alloy, and an inorganic material such as ceramic can be used. These materials, the heat conductivities of which are less than or equal to approximately 25 W/(m·K), which is an order of magnitude less than the heat conductivity of aluminum, make it possible to further simplify the shape of the heat insulating portion. Even more, as the metal material is superior in strength and heat resistance, the cross-sectional area of the heat insulating portion can be decreased, the thickness of the thin wall portion can be further decreased, or the area of the opening can be further increased, making it possible to facilitate a further size and weight reduction. Among others, titanium alloy as 64 titanium is more preferably used in that it is small in heat conductivity, has sufficient strength and heat resistance, and is also small in specific gravity.

Moreover, when a heating head in which a heating element is formed on an insulating substrate is used as a heating member to be mounted to the printhead or the head body according to the invention, the heating member can be reduced in size and can be brought to have a good energy efficiency and excellent thermal response properties. This makes it possible to facilitate a size reduction, a weight reduction, and a service life extension of a printhead and to carry out a quick start and on-demand fabrication.

Among materials for the printhead or the head body according to the invention, 64 titanium alloy (a titanium alloy comprising 6% aluminum and 4% vanadium) is low in heat conductivity, and the wear resistance, the heat resistance, and the chemical resistance thereof are excellent with respect to conditions to be required for the printhead of the 3D fabrication apparatus, so that it can be said to be an optimum material. In particular, a ceramic such as alumina ceramic or alumina-zirconia ceramic being used for an insulating substrate for the heating member is close in thermal expansion coefficient to 64 titanium alloy, so that a joining failure due to the heating cycle can be further alleviated, and, in addition, the ceramic is high in heat resistance and strong against thermal shock, making it possible to obtain a joining having a high joining strength. Moreover, the ceramic has a good compatibility with a thick film joining material such as a silver paste (that can contain glass or copper), for example, making it possible to carry out a good joining of the heating member to the melting portion of the head body using a thick-film technology and making it possible to use it more preferably. Furthermore, the 64 titanium alloy is closely analogous in thermal expansion coefficient to the ceramic, so that, even in a case that a deposition material requiring a high-temperature melting of a super engineering plastic, for example, is used, joining of the heating member (heating head) can be maintained in a good state.

In the specification, the printhead can mean a head body, or can mean a head body with a heating member being attached thereto.

Effects of the Invention

According to the invention, even when a printhead is integrally formed, heat as a result of heating a melting portion conducting to the supplying portion can be effectively suppressed to use most of supplied heat amount for heating and melting of a deposition material, making it possible to reduce the number of components of the printhead to alleviate assembly operations, makes it possible to facilitate a size reduction, a weight reduction, an energy reduction, and a service life extension of the printhead, and, moreover, makes it possible to increase the selection choices on the type of deposition material by making a high-temperature operation possible.

BRIEF DESCRIPTION OF THE DRAWINGS

FIG. 7 shows a cross-sectional view of another example of the conventional printhead.

DETAILED DESCRIPTION OF THE INVENTION

Figure 1A:
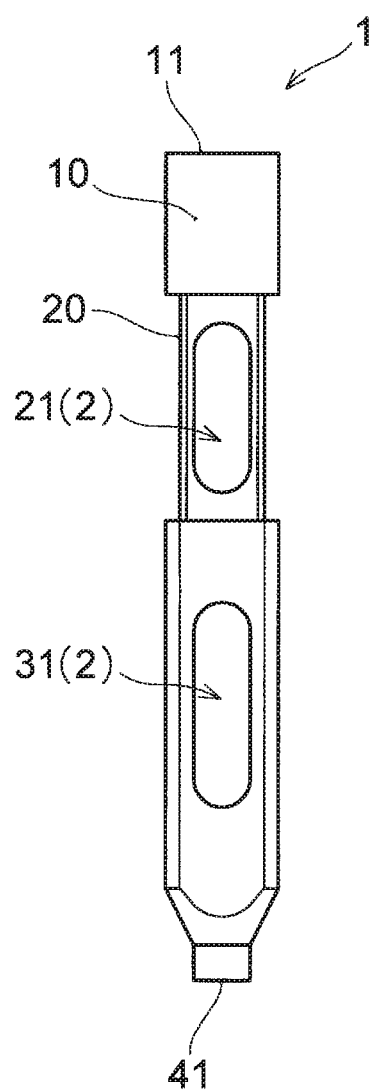
FIG. 1A shows a front view of a head body of a printhead dispensing deposition material according to one embodiment of the invention.
Figure 1B:
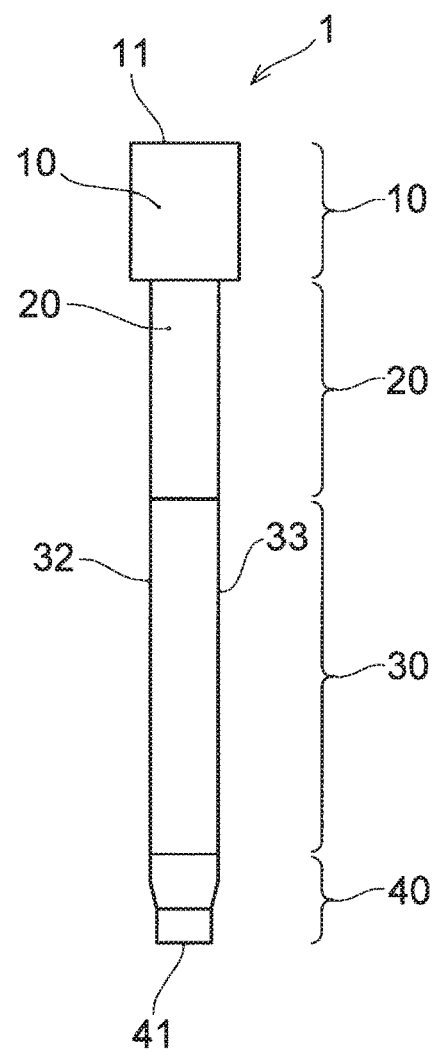
FIG. 1B shows a side view of a head body of a printhead dispensing deposition material according to one embodiment of the invention.
Figure 1C:
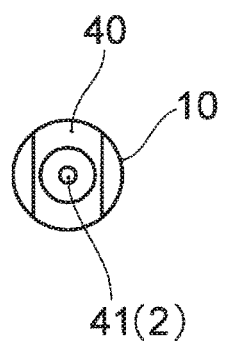
FIG. 1C shows a bottom view of a head body of a printhead dispensing deposition material according to one embodiment of the invention.

Below, with reference to the drawings, a printhead dispensing deposition material for a 3D fabrication apparatus according to one embodiment of the invention is described with reference to the drawings. A head body 1 of a printhead is shown in FIG. 1. The head body 1 is configured such that a metal rod is subjected to cutting, for example, the metal rod having the total length of 32 mm, for example, and the diameter of 4 mm φ, for example, and being shaped in a circular cylinder, the metal rod comprising 64 titanium (an alloy in which 6 mass % aluminum and 4 mass % vanadium are mixed into titanium), for example.

A flow path (through-hole) 2, the dimeter of which is 2 mm φ, for example, extending in one straight line to a discharging opening 41 to discharge (dispense) a filament on the other end side, the filament being melted, from a supplying opening 11 of a filament on one end side is formed in the head body 1. The size of the head body 1 and the flow path 2 can be changed appropriately in accordance with the size of the filament.

Figure 4A:
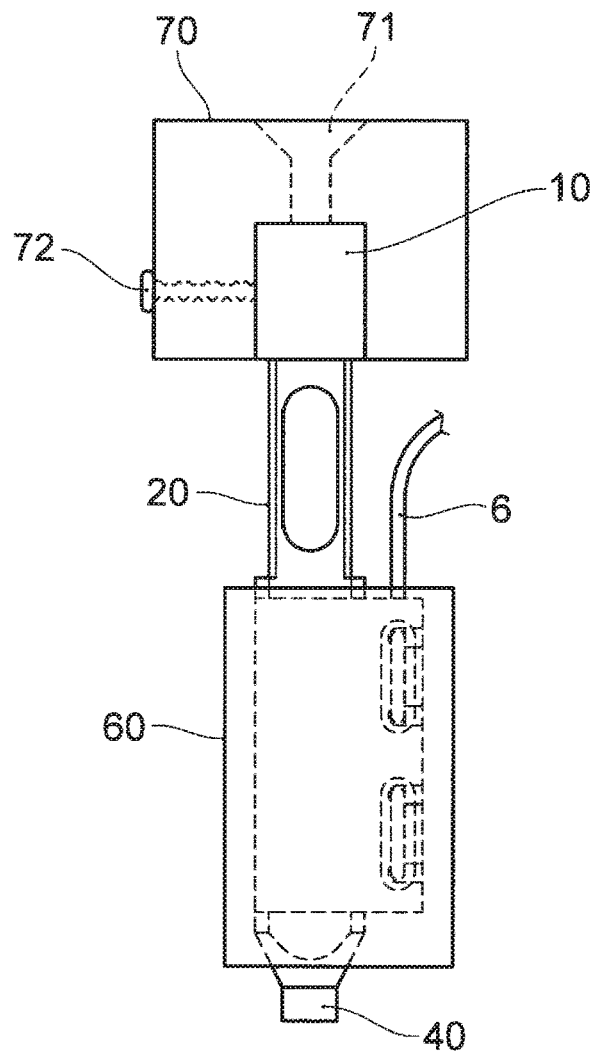
FIG. 4A shows a front view of a cover being attached to the heating member.

The head body 1 comprises, from one end side (the supplying opening 11) to the other end side (the discharging opening 41), a supplying portion 10; a heat insulating portion 20; a melting portion 30; and a discharging portion 40. The supplying portion 10 is configured to have a circular cylindrical shape (a cylindrical shape) having the length of 5 mm and the diameter of 4 mm φ, for example. The supplying portion 10 has the supplying opening 11 formed at the tip thereof and is formed in a tapered shape such that the flow path 2 broadens from 2 mm φ to 3 mm φ, for example, toward the supplying opening 11 side in proximity to the supplying opening 11. The supplying portion 10 also serves a role as an attaching portion to an adapter 70 (see FIG. 4A), the adapter to attach the supplying portion 10 to the 3D fabrication apparatus body.

The heat insulating portion 20 being positioned between the supplying portion 10 and the melting portion 30 is configured to have a circular cylindrical shape (a cylindrical shape) having the length of 11 mm and the diameter of 3 mm φ, for example. The heat insulating portion 20 is configured to have the diameter of 3 mm φ as described above, and has the flow path 2 formed, the flow path having the diameter of 2 mm φ, the flow path penetrating the central portion thereof, so that a thin wall portion whose wall thickness of the outer wall thereof is 0.5 mm is configured to be formed. Moreover, an opening 21 having the length of 8 mm and the width of 1.8 mm, for example, is formed at the central portion of the heat insulating portion 20 such that it is formed in a pair being opposed such that it exposes the flow path 2. The opening 21 can be formed such that it is cut to be opened from the flat surface side and the rear surface side of the heat insulating portion 20. Moreover, the opening 21 can be provided in one or a plurality in the length direction and/or the width direction and the size thereof can also be determined appropriately. In short, the cross-sectional area can be determined appropriately within the range in which the strength is guaranteed in relation to heat resistance.

The melting portion 30 is configured to have the length of 13 mm and the diameter of 4 mm φ, for example. Two flat surface portions 32 and 33 being cut from the flat surface side and the rear surface side are formed in the melting portion 30 such that they oppose with a 3 mm separation, for example. An opening 31 having the length of 8 mm and the width of 1 mm, for example, is formed in the central portion of the flat surface portions 32 and 33 such that it exposes the flow path 2. The opening 31 can be formed in parallel in a plurality in the length direction. In addition, the surface of the flat surface portions 32 and 33 can be roughened, or only roughening can be carried out without forming the opening 31. Moreover, in proximity to the discharging portion 40 of the melting portion 30, the flow path 2 is narrowed in a tapered shape toward the discharging portion 40 and is brought to have the diameter of 0.6 mm φ, for example, in the discharging portion 40.

The discharging portion 40 is brought to have the length of 3 mm, for example, is cut from the front surface side and the rear surface side to have the width of 3 mm, for example, and both of the side surface sides are made narrower into a tapered shape toward the discharging opening 41 up to some midpoint in the length direction of the discharging portion 40, and the tip at which the discharging opening 41 is formed is brought to have the diameter of 1.5 mm φ, for example, and the discharging opening 41 is brought to have the diameter of 0.6 mm φ, for example.

Figure 2A:
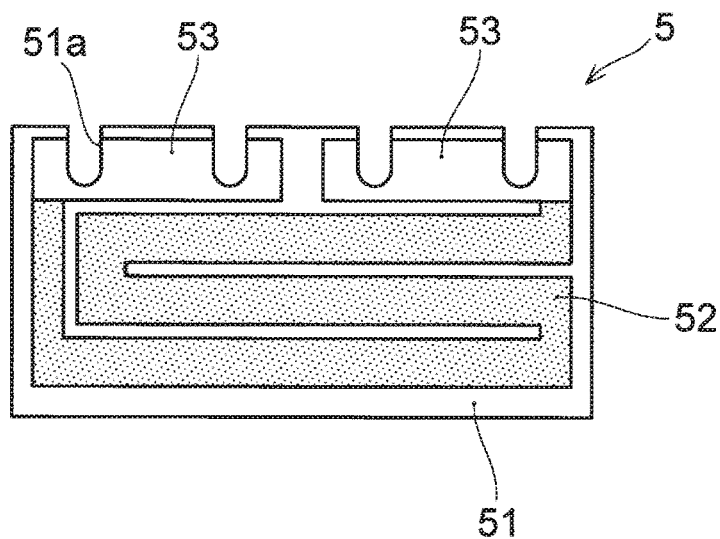
FIG. 2A shows a front view of a heating head.

Next, one example of a heating head (a heating member) 5 to be attached to the flat surface portions 32 and 33 of the melting portion 30 of the head body 1 is shown in FIG. 2A.

The heating head 5 comprises an alumina-zirconia ceramic substrate (an insulating substrate) 51 having a rectangular plate shape, the alumina-zirconia ceramic substrate 51 having the thickness of 0.3 mm, the length of 12 mm, and the width of 5 mm, for example; a heating element 52 having a belt shape, the heating element 52 being formed on the surface of the insulating substrate 51; and two electrodes 53, 53 being formed to be eccentric at one end along the length direction of the insulating substrate 51 so as to connect to the respective opposite ends of the heating element 52 on the surface of the insulating substrate 51. The surface of the heating element 52 can be coated with a protective layer (a dielectric layer) such as glass, the protective layer comprising a filler not shown, for example. The sintering temperature of the insulating substrate 51 is approximately 850° C.

Four notches 51a are provided at the side edge on one side along the length direction of the insulating substrate 51 at a predetermined interval such that two each thereof make a contact for the electrodes 53, 53, respectively, so that the four notches 51a line up in the length direction. The width of a window of the notch 51a is brought to be 0.4 mm, for example, while the depth thereof is brought to be 0.6 mm, for example.

With respect to the heating head 5, a paste for a thick film comprising alloy powder such as Ag, Pd, or Pt alloy, or ruthenium oxide, for example, is printed in a predetermined pattern and dried, and, thereafter, the dried paste for the thick film can be sintered at a predetermined temperature to form the heating element 52 and the electrodes 53, 53.

Figure 2B:
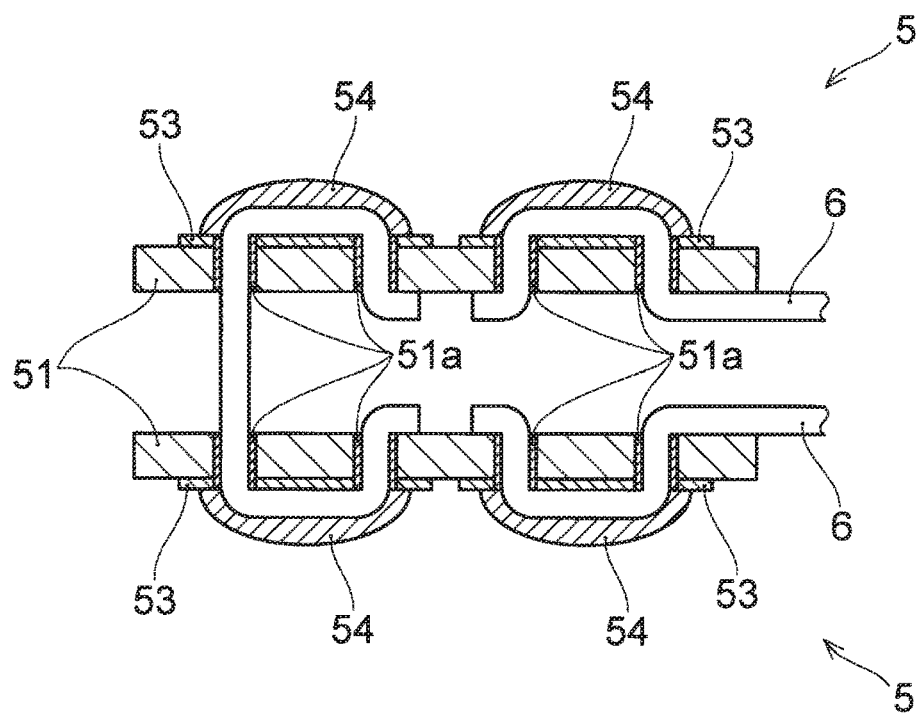
FIG. 2B shows a cross-sectional view of one example of the connection structure between an electrode terminal of the heating head and a lead, the heating head to be attached to the head body.

FIG. 2B shows an explanatory view of the connection structure between the electrode 53 and a lead (wire) 6. The lead 6 comprising a wire material such as silver, silver alloy, or silver-plated copper, for example, is hooked to eight notches 51a of a pair of heating heads 5, 5 such that it alternately meanders between the front and rear surfaces of the insulating substrate 51 from the end edge of the insulating substrate 51. Here, the four electrodes 53, 53, 53, 53 are serially connected with the one lead 6, and the opposite ends of the lead 6 are drawn out from the rear surface side of the insulating substrate 51 of the notches 51a, 51a on one end side of the pair of heating heads 5, 5. In this state, a silver-based thick-film electrode pastes 54 being such as Ag paste, Ag—Pd paste, and Ag—Pd—Pt paste, for example, is applied, sintered at the temperature being a little lower than the sintering temperature of the heating head 5 being 850° C., for example, approximately 750° C., and the lead 6 is joined and fixed to the electrode 53. The adoption of a material that can be sintered at the temperature being a little lower than the sintering temperature of the heating head 5 for connection of the lead 6 is to prevent a change in the material being sintered at 850° C. in the heating head 5. Thereafter, the lead 6 can be cut on the rear surface side of the insulating substrate 51 between both of the electrodes 53, 53 of the heating head 5 to configure the heating element 52 of each of the two heating heads 5, 5 to be serially connected to draw out the lead 6. The two heating heads 5, 5 can be driven independently such that they can be brought to have different temperatures and, moreover, control pattern for the two heating heads 5, 5 can be made different.

Moreover, while two each of the notches 51a, 51a are configured to be provided in a portion in which the electrodes 53, 53 of the insulating substrate 51 are formed, the number of notches formed can be one, or at least three. Moreover, a through-hole can be provided in one or a plurality instead of the notch, or a combination of the notch and the through-hole can be used. In other words, the notch or the through-hole being provided is to ensure that no connection failure occurs even when heating to high temperature is carried out or a moving operation is carried out two-dimensionally or three-dimensionally by increasing the connection area or taking a measure in which mechanical engagement such as an anchoring effect is obtained to improve the connection strength between the electrode 53 and the lead 6. Among others, with respect to the notch, the lead 6 is easily attached to the heating head 5, making it possible to improve the connection operation.

Figure 3A:
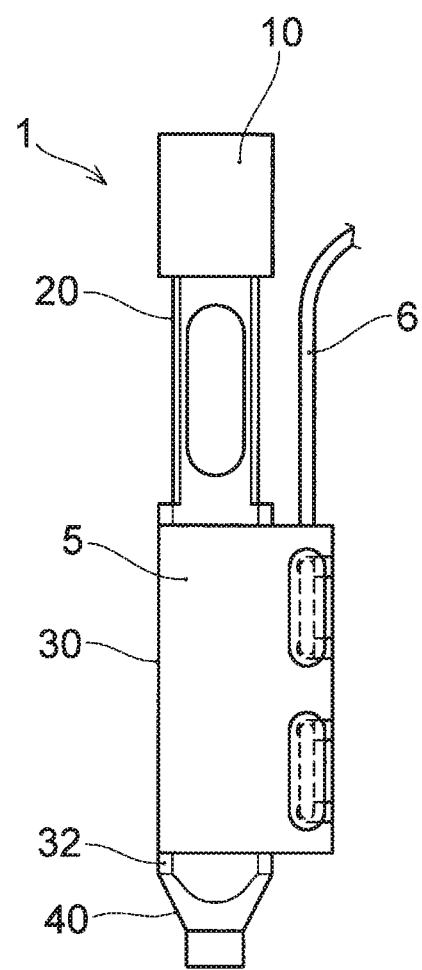
FIG. 3A shows a front view of the heating head being joined and attached to the head body.
Figure 3B:
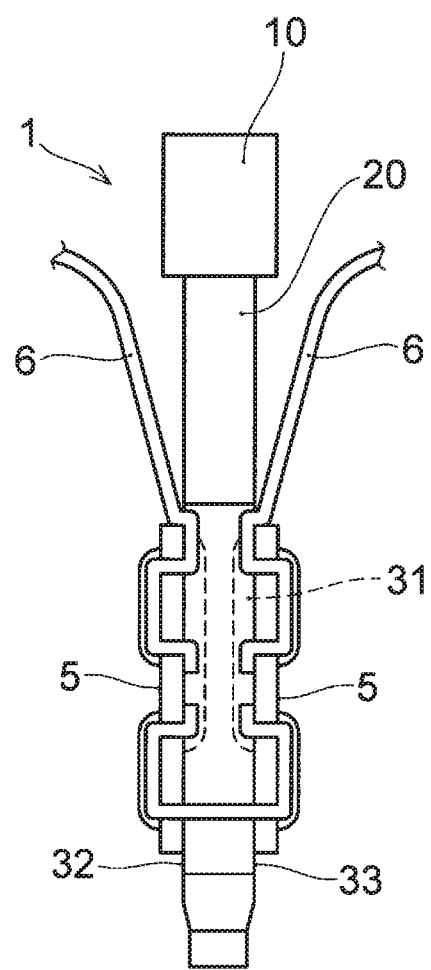
FIG. 3B shows a cross-sectional view of the heating head being joined and attached to the head body.

FIG. 3 shows the heating head 5 being attached to the head body 1. The rear surface (the rear surface of the insulating substrate 51) side of the heating head 5 is joined to the flat surface portion 32 of the melting portion 30 of the head body 1 so as to cover the opening 31 by applying and sintering a silver-based thick-film paste (Ag containing glass or Cu, for example), for example as a joining material. Similarly, another heating head 5 is joined also to the flat surface portion 33. Here, a joining material entering the opening 21 to obtain the anchoring effect makes it possible to firmly join the heating heads 5, 5 to the melting portion 30 of the head body 1 to attach the heating heads 5, 5 thereto.

Each of the two heating heads 5, 5 is joined to the melting portion 30 so as to be eccentric in the same direction, so that it is attached thereto with the side edge of the heating head 5 protruding from one side edge of the melting portion 30. In other words, the heating head 5 is attached to the melting portion 30 while the notch 51a, 51a and the lead 6 protruding from the melting portion 30, making it possible to have the leads 6, 6 being drawn out from the opposing pair of heating heads 5, 5 to be extended out to the supplying portion 10 side from the same side edge side of the melting portion 30.

According to the embodiment, the width (5 mm) of the heating head 5 is made slightly greater than the width (4 mm) of the flat surface portions 32, 33 of the melting portion 30 of the head body 1, so that the heating heads 5, 5 is joined to the head body 1 while the connecting portion between the heating head 5 and the lead 6 is made to protrude outward from the side edge on one side of the flat surface portions 32, 33 of the melting portion 30 of the head body 1.

Figure 4B:
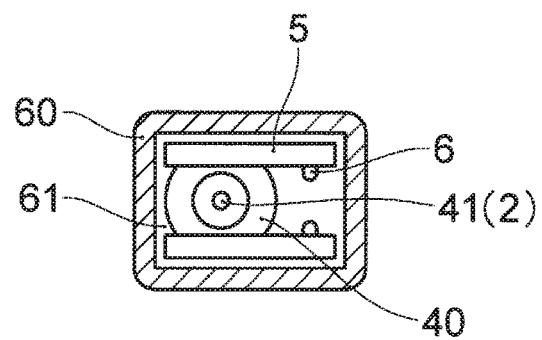
FIG. 4B shows a bottom view of a cover being attached to the heating member.

FIG. 4 shows one example of a covering member 60 being attached to the printhead. For example, the heating heads 5, 5 are covered with the covering member 60 made of stainless steel, for example. A fixing member 61 is filled between the covering member 60 and the heating heads 5, 5. As the fixing member 61, a tape-like fabric into which ceramic fibers are woven can be used, for example, and this fabric is wound around the heating heads 5, 5 and a part of the wound-round fabric is fixed to the inner surface of the covering member 60 by a solidifying insulating material for joining, the solidifying insulating material being a cement-like inorganic material, for example. Here, preferably, the lead 6 is fixed further using the solidifying insulating material for joining.

Furthermore, when the printhead according to the invention is attached to the 3D fabrication apparatus, the supplying portion 10 on the printhead side can be inserted into an opening provided in the adapter 70 to be attached to the 3D fabrication apparatus body side and fixed laterally using a push screw 72, for example. In the adapter 70, a flow path 71 to be communicatively coupled with the supplying opening 11 of the supplying portion 10 is formed and an opening at the inlet of the flow path 71 is configured to be a hole having the diameter being greater than the inside thereof to make it easy to insert a filament therethrough. While the supplying portion 10 is configured to be attached to the adapter 70 using the push screw 72 according to the embodiment, it can be attached to the adapter by screwing together with a screw groove being cut at the outer periphery of the supplying portion 10.

Figure 5:
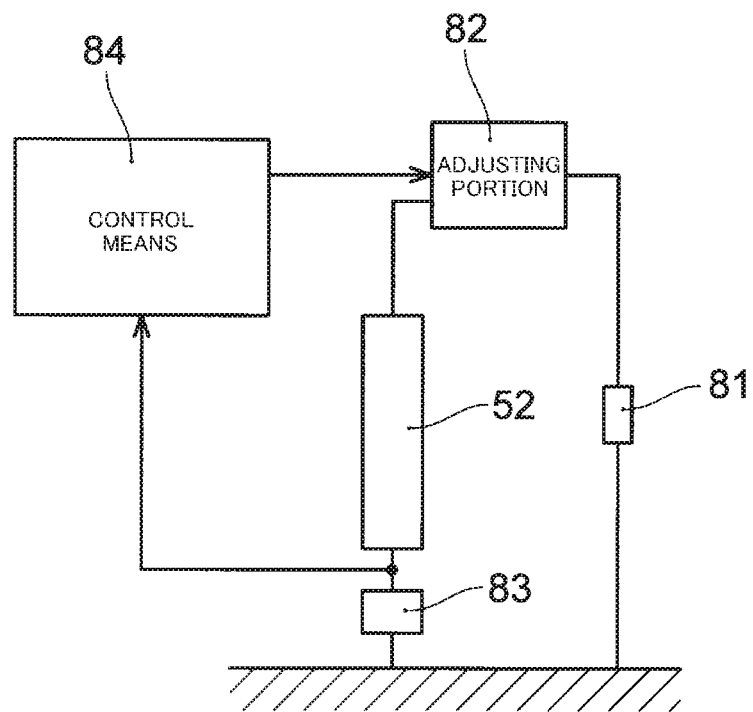
FIG. 5 shows a diagram of a circuit to measure the temperature of an insulating substrate of the heating head.
Figure 6:
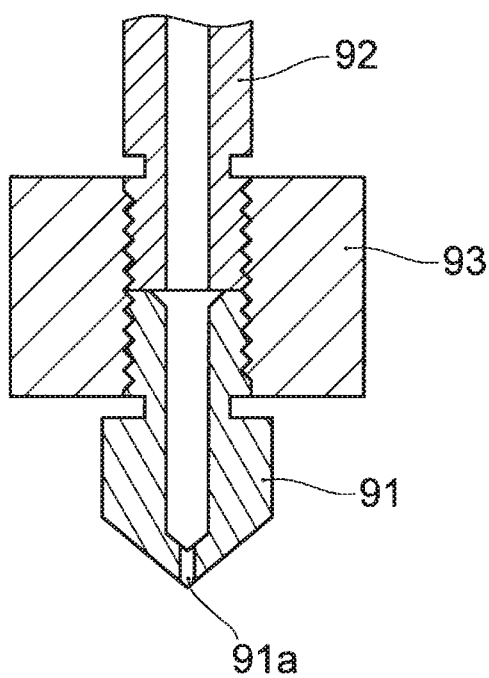
FIG. 6 shows a side view of one example of the conventional printhead.

FIG. 5 shows a block diagram of one example of a control circuit to also measure the temperature of a substrate using the heating element 52 in the printhead. In other words, it shows an example in which this drive circuit is driven with a DC or AC power supply 81 connected to the heating element 52 via an adjusting portion 82 for adjust the applied power, where the power supply is a battery, a commercial power supply, or a commercial power which voltage or an application time has been adjusted by a transformer.

A voltage to be supplied by the commercial AC power supply 81 is adjusted by the adjusting portion 82 for power and is adjusted so as to reach a desired temperature. This causes a DC power supply to be unnecessary and a fan to cool a power supply to be unnecessary. However, a DC power supply using a battery can be used. Moreover, while not shown, heating can be carried out by pulse driving to apply a pulse. In that case, besides changing a voltage, an effective applied power with respect to heat dissipation can be adjusted by a phase control or changing of a duty cycle.

That temperature can be detected utilizing the heating element 52 in accordance with a change in the resistance value thereof. With respect to the change in the resistance value of the heating element 52, as shown in FIG. 5, a change in current can be detected by measuring the voltage of the opposite ends of a shunt resistance 83 being connected serially with the heating element 52. When the voltage to be applied to the heating element 52 is constant, knowing the change in current allows knowing the change in the resistance value. In other words, the resistance value of the heating element 52 has the temperature property that changes in accordance with temperature. Therefore, by detecting in advance the temperature property (the temperature coefficient) thereof allows knowing the temperature of the heating element 52, in other words, the insulating substrate 51, by knowing the resistance value of the heating element 52. This temperature detection is carried out by a control means 84. The temperature coefficient of this heating element 52 is determined by the material and, as described previously, it is preferably a positive temperature coefficient, the absolute value of which is as great as possible (for example, +3300 ppm/° C.). Moreover, with respect to the shunt resistance 83, the lower the resistance value thereof the more preferable as long as it is possible to carry out a temperature detection to avoid the effect of heat dissipation. Moreover, the resistance having the temperature coefficient being as small as possible is preferable, and current is set to be smaller to avoid the effect of heat dissipation by current. A control signal is output from the control means 84 such that a voltage applied to the heating element 52 is adjusted by the adjusting portion 82. In this way, use of the temperature measurement of the insulating substrate 51 can be shared with that of the heating element 52 to reduce the electrode terminals and, as shown in FIG. 4, the two leads 6, 6 can be drawn from one side of the head body 1.

It has been confirmed that the printhead according to the above-described embodiment can rapidly increase in temperature to a high temperature of 500° C. and, even more, can operate with low power consumption. Moreover, it has also been confirmed that PEEK (polyetheretherketone) being known as superengineering plastics having a high heat resistant temperature can be fabricated well using as a filament. Here, it has also been confirmed that heat conductance can be effectively suppressed in the heat insulating portion 20 of the head body 1, no failure occurs with the flow path 2 in the supplying portion 10 due to melting of the filament, and no failures at all occur at a joining portion and a connecting portion between the head body 1 and the heating head 5 and between the heating head 5 and the lead 6, causing the printhead to operate well.

Furthermore, the printhead according to the above-described embodiment is brought to have the length of 32 mm and the width of 5 mm as a whole, so that it is brought to be much smaller than the existing printhead. Moreover, in a case that the head body 1 is formed with 64 titanium alloy, it is extremely reduced in weight, together with it being reduced in size. Thus, even in a case that fabrication is carried out with the printhead according to the embodiment being moved two-dimensionally or three-dimensionally, drive energy can be reduced. Furthermore, being reduced in size, a plurality of printheads make it possible to arrange the discharging opening 41 of each of the printheads in proximity, and to be bundled by an attaching jig (an adapter), making it possible to use the plurality of printheads as multi-nozzle heads or multi-nozzle line heads. These multi-nozzle heads or multi-nozzle line heads can be suitably used for high-speed fabrication of a multi-material.

Moreover, the printhead according to the invention can be heated at high temperature, so that it can be used for a fixed melting point metal group or a low melting point glass group.

Furthermore, according to the above-described embodiment, the heating head 5 is configured to be used as a heating member, making it possible to facilitate a size reduction and a weight reduction and also facilitate low power consumption in heating, and, together with the heat insulating portion 20 being provided between the supplying portion 10 and the melting portion 30 of the head body 1, making it possible to deal with high temperature and a rapid increase in temperature. Furthermore, while the one heating head 5 is configured to be mounted to the flat surface portion 32 of the melting point 30 of the head body 1 according to the embodiment, a plurality of heating heads can be configured to be mounted while dividing the plurality of heating heads in the length direction, and heating by these plurality of heating heads can be configured to be controlled according to different temperature or different temperature increase/decrease patterns.

In addition, an electrode can be added at some midpoint of the heating element 52 of the heating head 5 and a different lead can be drawn out therefrom to separately control as two heating elements, or a lead can be drawn out such that the heating elements 52, 52 of the two heating heads 5, 5 are connected in parallel to separately control the heating heads 5, 5.

Moreover, in a case that a titanium alloy (for example, 64 titanium) as a material for the head body 1 and a ceramic substrate (for example, an alumina-zirconia substrate) as the insulating substrate 51 of the heating head 5 are used, the thermal expansion coefficient for titanium alloy is close to that for ceramic, making it possible to effectively prevent a joining failure due to the heating and cooling cycles due to the fabrication operation. Furthermore, as the alumina-zirconia substrate is high in mechanical strength relative to the alumina substrate, it can be decreased in thickness, making it possible to facilitate a further size and weight reduction of the heating head.

Even more, joining and connecting of the head body 1 and the heating head 5 and the lead 6 can be carried out using the same metal-based thick film paste (for example, a silver-based paste), a good joining between the head body 1 and the heating head 5 and a good connection between the heating head 5 and the lead 6 can be provided, joining and connection failures can be prevented even in a case that the heating head 5 is heated to high temperature. Moreover, the heating head 5 can be joined to the head body 1 using a thick film technique, making it possible to prevent a change in the property of an electronic device.

According to the invention, a head body is integrally formed (integrally molded), the number of positions at which components are joined is reduced, and, at a joining portion between the head body (titanium alloy) and the heating head (ceramic) in particular, a heat-resistant joining can be carried out firmly with an addition of the property of the metal oxide of the head body, making it possible to further improve the reliability.

Furthermore, while it is configured to form a thin wall portion and an opening in the heat insulating portion 20 according to the embodiment, with respect to the heat insulating portion, the thickness thereof and the size and the number of the openings thereof can be determined to have a cross-sectional area to have a suitable heat resistance, taking into account the heat conductivity of a material to be used for the head body 1, the length thereof, and the heating temperature by the heating head 5 (the melting point of the deposition material to be used).

EXPLANATION OF SYMBOLS 1 head body
2 flow path 5 heating head
6 lead
10 supplying portion
20 heat insulating portion
30 melting portion
40 discharging portion
60 covering member
70 adapter

The invention claimed is:

1. A printhead dispensing deposition material for a 3D fabrication apparatus, the printhead dispensing deposition material comprising:
 a supplying portion comprising a supplying opening for supplying a deposition material;
 a melting portion to melt the supplied deposition material with a heating member being attached;
 a discharging portion comprising a discharging opening to discharge the melted deposition material;
 a heat insulating portion between the supplying portion and the melting portion, the heat insulating portion operable to suppress heat in the melting portion conducting to the supplying portion,
 wherein the supplying portion, the melting portion, the discharging portion, and the heat insulating portion are integrally formed as one piece in a seamless manner and defining a flow path extending continuously from the supplying opening to the discharging opening without interruption; and
 the printhead dispensing deposition material comprising 64 titanium alloy.

2. The printhead dispensing deposition material for the 3D fabrication apparatus according to claim 1, wherein a cross-sectional area of the heat insulating portion is less than a cross-sectional area of the melting portion.

3. The printhead dispensing deposition material for the 3D fabrication apparatus according to claim 1, wherein an outer wall of the heat insulating portion comprises a thin wall portion having a thickness being brought to be less than a thickness of an outer wall of the melting portion or an opening.

4. The printhead dispensing deposition material for the 3D fabrication apparatus according to claim 1, wherein the heating member comprises a heating head, and the heating head comprises a heating element being formed on an insulating substrate.

5. The printhead dispensing deposition material for the 3D fabrication apparatus according to claim 3, wherein the heat insulating portion comprises the opening and the opening is vertically elongated.

6. The printhead dispensing deposition material for the 3D fabrication apparatus according to claim 3, wherein the melting portion comprises an opening being formed in an outer wall of the melting portion, and the opening formed in the outer wall of the melting portion is closed by the heating member being attached to the outer wall of the melting portion.

7. The printhead dispensing deposition material for the 3D fabrication apparatus according to claim 4, wherein the melting portion includes a roughened surface to which the heating member is attached.

8. A 3D fabrication apparatus, wherein the printhead dispensing deposition material for the 3D fabrication apparatus according to claim 1 is mounted thereto.

9. The printhead dispensing deposition material for the 3D fabrication apparatus according to claim 1, wherein an outer wall of the heat insulating portion comprises a thin wall portion having an opening.

10. The printhead dispensing deposition material for the 3D fabrication apparatus according to claim 1, wherein the flow path extends in smooth transition between the supplying opening to the discharging opening.

* * * * *